United States Patent
Brown, Jr.

(10) Patent No.: US 7,177,920 B1
(45) Date of Patent: Feb. 13, 2007

(54) METHOD FOR CONFIGURING AN UPGRADED ADMINISTRATIVE MODULE COMPUTER IN AN ELECTRONIC SWITCHING SYSTEM

(75) Inventor: Richard O. Brown, Jr., Roswell, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 963 days.

(21) Appl. No.: 10/060,706

(22) Filed: Jan. 30, 2002

(51) Int. Cl.
*G06F 15/177* (2006.01)

(52) U.S. Cl. .................. 709/220; 709/221; 709/222; 709/223; 717/105; 717/177

(58) Field of Classification Search ............ 709/220, 709/223; 707/104.1; 717/169, 170, 105, 717/177
See application file for complete search history.

(56) References Cited

U.S. PATENT DOCUMENTS

| | | | |
|---|---|---|---|
| 6,169,994 B1 * | 1/2001 | Lennert et al. .......... 707/104.1 |
| 6,247,128 B1 * | 6/2001 | Fisher et al. ................ 713/100 |
| 6,795,965 B1 * | 9/2004 | Yadav ......................... 717/168 |
| 2003/0046657 A1 * | 3/2003 | White .......................... 717/105 |
| 2003/0182656 A1 * | 9/2003 | Leathers et al. ............. 717/177 |

OTHER PUBLICATIONS

*Administrative Module Conversions 3B20D to 3B21D Administrative Module, 5ESS-2000 Switch Handbook*, Lucent Technologies, Network Software Center, (SIG-C-WU-100), Section 9102, Dec. 22, 2000. pp. 1-171.

* cited by examiner

*Primary Examiner*—Yves Dalencourt
(74) *Attorney, Agent, or Firm*—Merchant & Gould

(57) ABSTRACT

A method for configuring an upgraded administrative module computer is provided. A standard hardware and software configuration for the upgraded administrative module computer is defined. An equipment configuration database is created that may be utilized by the upgraded administrative module computer to configure itself in accordance with the standard hardware and software configuration. The equipment configuration database is transmitted to a downlevel administrative module computer. Data stored on the downlevel computer system is migrated to an upgraded administrative module computer. The equipment configuration database is utilized to configure the upgraded administrative module computer according to the standard hardware and software configuration.

16 Claims, 11 Drawing Sheets

| IOP | | | | | 3B21D STANDARD | | | | | | | WAN (DATAKIT) | |
|---|---|---|---|---|---|---|---|---|---|---|---|---|---|
| IOP | COMM | SLOT | PORT | ID | CNTL NAME | CARD TYPE | TTY/SDL | TTY | CIRCUIT | EQL | STATE | ID | LOC |
| 0 | 0 | 0 | 0 | 0 | MMTTYC | UN583 | PTSW | TTYA | ROP | 045-186-132 | IS | NA | QUIET |
| 0 | 0 | 0 | 0 | 1 | MMTTYC | UN583 | PTSW | TTYZ | MCC | 045-186-372 | IS | NA | QUIET |
| ... | ... | ... | ... | ... | ... | ... | ... | ... | ... | ... | ... | ... | ... |
| 0 | 0 | 3 | 0 | 3 | TTYC18 | UN582 | TTY9 | TTYJ | RC/U DATAKIT | 019-118-132 | | | |
| ... | ... | ... | ... | ... | ... | ... | ... | ... | ... | ... | ... | ... | ... |
| 0 | 2 | 1 | 0 | 9 | SDLC0 | UN582 | SDL0 | | SCANS | 028-102-132 | ... | | |
| ... | ... | ... | ... | ... | ... | ... | ... | ... | ... | ... | | | |
| 2 | 3 | 2 | 0 | 14 | SPU20 | UN375 | MHD14 | | | 011-124-XXX | | | |
| 3 | 0 | 0 | 0 | 0 | SPU20 | UN375 | MHD15 | | | 062-124-XXX | | | |

*Fig.5.*

METHOD FOR CONFIGURING AN UPGRADED ADMINISTRATIVE MODULE COMPUTER IN AN ELECTRONIC SWITCHING SYSTEM

FIELD OF THE INVENTION

Embodiments of the present invention relate to the field of telephone networks. More particularly, embodiments of the present invention relate to configuring an upgraded administrative module computer system for use at a digital telephone switch site.

BACKGROUND OF THE INVENTION

The LUCENT TECHNOLOGIES 5ESS switch is one of the most frequently installed digital telecommunications switches in the world, with over 100,000,000 lines operational in the U.S. and International markets. Since its introduction, the 5ESS line of switches has grown tremendously in both size and range of applications. Moreover, along with the evolution in functionality and size of the switch has come an ongoing improvement in its performance.

One way that the performance of the 5ESS series of switches has been improved is through an upgrade of the computer system that comprises the administrative module ("AM") utilized by the switch. A typical 5ESS switch includes an AM, a communications module ("CM") and one or more switching modules ("SMs"). The SMs, which perform about 95% of the call processing work at the switch, contain the line interfaces to voice/data end users and trunk interfaces to other elements of a telecommunications network.

The CM is the hub through which messages flow between the components of the switch and may perform some operations, administration, and management ("OA&M") functions. The AM acts as the centralized control for OA&M and is the point of interface for craft control and external Operational Support Systems ("OSSs"), such as billing. Some models of the 5ESS switch utilize the LUCENT TECHNOLOGIES 3B20D (duplex) computer system as the main processor for the AM.

In order to upgrade the AM in models of the 5ESS utilizing the LUCENT TECHNOLOGIES 3B20D computer system, the AM is typically replaced with an upgraded AM computer system. Specifically, the downlevel 3B20D is typically replaced with a LUCENT TECHNOLOGIES 3B21D computer system. The 3B21D is a high-speed, high-reliability, fault-tolerant, duplex computer, and is bit-compatible with the 3B20D. The hardware of the 3B21D contains self-checking and error-correction circuitry. The software of the 3B21D detects faulty processes and equipment, reconfigures or reinitializes the system, and diagnoses and identifies faulty equipment.

In order to reduce the amount of switch down time when replacing a downlevel AM computer system with an upgraded AM computer system at a functioning switch site, the upgraded AM computer system must be configured for use at the site prior to physically connecting the upgraded AM computer system to the other components of the switch. Configuring an upgraded AM computer system typically involves configuring the upgraded AM to recognize attached teletype ("TTY") and synchronous datalink ("SDL") devices, configuring "growth" input/output processors ("IOPs") installed in the upgraded AM computer system, configuring growth moving head disks ("MHDs"), and configuring the AM for data communication over one or more external networks. Previous methods for configuring an upgraded AM computer system require these tasks to be performed manually. However, manual configuration of an upgraded AM computer system can cause a number of serious problems.

The main drawback with manually configuring an upgraded AM computer system is that there is a high probability of errors being introduced into the configuration of the upgraded AM computer system as a result of human mistake. If the configuration is incorrect when the AM computer system is connected to the switch, the switch may not function properly, thereby causing expensive switch down time. Moreover, manually configuring an upgraded computer system may literally take days to complete. This greatly increases the cost of installing the upgraded AM computer system and delays the time when the upgraded AM can be utilized by the switch.

Therefore, in light of the above, there is a need for an improved method of configuring an upgraded AM computer system that reduces the amount of manual configuration required to configure the upgraded AM for use at an existing switch site and that decreases the possibility of configuration errors. Moreover, there is a need for an improved method of configuring an upgraded AM computer system that reduces the amount of time required to configure an upgraded AM computer system.

SUMMARY OF THE INVENTION

The present invention solves the above-described problems by providing a new method and computer-readable medium for configuring an upgraded AM computer system in an electronic switching system. Embodiments of the method described herein reduce the amount of manual configuration required when upgrading an AM computer system and thereby decrease the possibility of configuration errors introduced as a result of human error. Moreover, embodiments of the present invention significantly reduce the amount of time required to configure an upgraded AM computer system for use within an electronic switching system.

One embodiment of the present invention comprises defining a standard hardware and software configuration for the upgraded AM computer. The standard hardware and software configuration may include a standard configuration for TTY and SDL devices connected to the upgraded AM computer, a standard configuration of IOPs and mass storage devices in the upgraded AM computer, and a standard configuration of data communication circuits connecting the upgraded AM computer to external networks.

Once the standard hardware and software configuration has been created, an equipment configuration database ("ECD") is created that may be utilized by the upgraded AM computer to configure itself in accordance with the standard hardware and software configuration. According to one actual embodiment of the present invention, the ECD is created by making an editable copy of an ECD on an upgraded AM computer system and modifying the editable copy of the ECD to reflect the standard hardware and software configuration.

After the ECD implementing the standard hardware and software configuration has been created, the ECD is transmitted to the downlevel AM computer system utilized at the electronic switching site. According to one actual embodiment of the present invention, the ECD is combined with support files and compressed to create a configuration install package prior to transmitting the ECD to the downlevel AM computer system. The configuration install package may then be transmitted to the downlevel AM computer system through a networked software distribution system.

Once the ECD implementing the standard hardware and software configuration has been received at the downlevel AM computer system, data stored on the downlevel computer system may be migrated to the new upgraded AM computer system to be installed at the electronic switching site. According to an actual embodiment of the present invention, migrating the data stored on the downlevel AM computer comprises copying data files stored on the downlevel AM computer, including the ECD implementing the standard hardware and software configuration, to the upgraded AM computer to be installed at the electronic switching site.

Once the ECD implementing the standard hardware and software configuration has been migrated to the upgraded AM computer system, the ECD may be utilized to configure the upgraded AM computer according to the standard hardware and software configuration. According to an actual embodiment of the present invention, an install script is first executed that uncompresses the configuration install package and configures the upgraded AM computer system with the ECD implementing the standard hardware and software configuration. The ECD may also be manually customized to configure the upgraded AM computer for use with one or more non-standard external devices.

According to one actual embodiment of the present invention, the install script creates a backup copy of an existing ECD stored on the upgraded AM computer system. The install script then deletes an existing ECD and copies the ECD implementing the standard hardware and software configuration to its proper location. Support files may also be copied to their proper locations. The upgraded AM computer may then be restarted utilizing the ECD to complete the configuration of the upgraded AM computer utilizing the standard hardware and software configuration.

Various embodiments of the present invention also provide a method, system, computer-controlled apparatus, and computer-readable medium for configuring an upgraded AM computer in an electronic switching system. Additional aspects of the various embodiments of the present invention will be described further with reference to the Detailed Description that follows.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 5 is a data structure diagram showing an illustrative standard hardware and software configuration utilized to configure an upgraded AM computer system in various embodiments of the present invention;

DETAILED DESCRIPTION OF AN ILLUSTRATIVE EMBODIMENT

In the following detailed description, reference is made to the accompanying drawings which form a part hereof, and in which is shown by way of illustration specific embodiments or examples. These embodiments may be combined, other embodiments may be utilized, and structural, logical, and electrical changes may be made without departing from the spirit and scope of the present invention. The following detailed description is, therefore, not to be taken in a limiting sense, and the scope of the present invention is defined by the appended claims and their equivalents.

Figure 1:
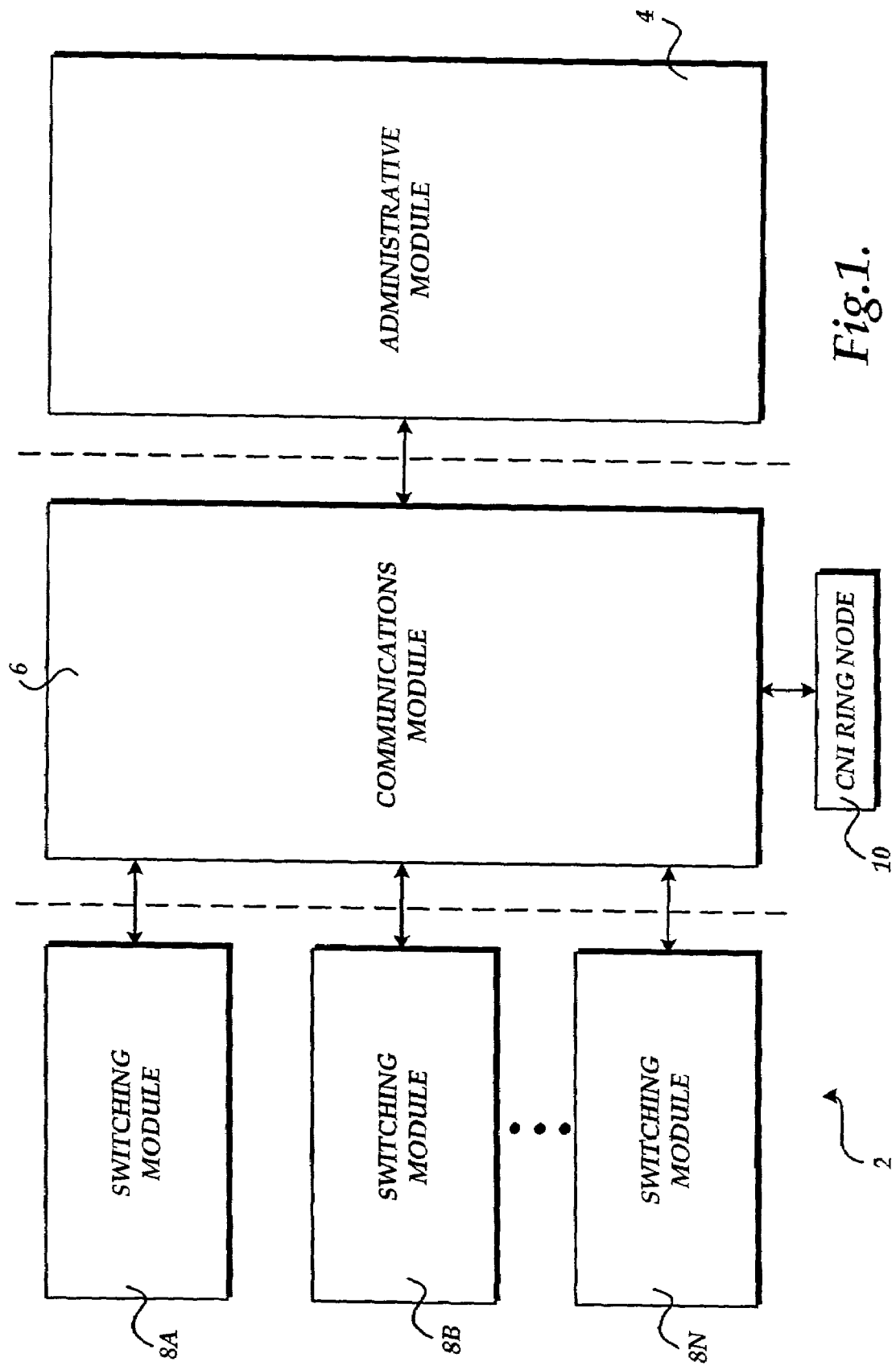
FIG. 1 is a block diagram showing the hardware architecture of an electronic switching system that comprises an operating environment for embodiments of the present invention.

As described briefly above, embodiments of the present invention include a method, system and apparatus for configuring an upgraded AM computer in an electronic switching system. Referring now to FIG. 1, an illustrative operating environment for embodiments of the present invention will be described. According to the one embodiment of the present invention described herein, the electronic switching system 2 comprises a 5ESS switch from LUCENT TECHNOLOGIES. As known to those skilled in the art, the 5ESS switch is based on a distributed hardware architecture. In particular, the 5ESS switch includes an administrative module ("AM") 4, a communications module ("CM") 6, and one or more switching modules 8A–8N. A common network interface ("CNI") ring node 10 is also provided to create an interface to the signaling system seven ("SS7") network for interswitch trunking and other applications.

As known to those skilled in the art, the CM 6 is the hub through which messages flow between the various components of the electronic switching system 2. The CM 6 is composed of a number of different hardware units including a peripheral interface controller, module message processors, quad-link packet switch ("QLPS") and QLPS gateway processors. The CM 6 also connects voice and data paths between the switching modules 8A–8N.

The switching modules 8A–8N are responsible for approximately 90% of the call processing work performed at the electronic switching system 2. The switching modules 8A–8N contain line interfaces to voice/data end users and trunk interfaces to other elements of a telecommunications network. Voice/data paths through the switching modules 8A–8N are implemented as time slots which are time-division switched by a time slot interchanger.

The AM 4 acts as the centralized control for OA&M and is the point of interface for craft control and external OSSs, such as billing. For the international version of the electronic switching system 2, the AM 4 also performs some call processing work. In downlevel versions of the 5ESS switch, the AM 4 comprises the 3B20D computer system from LUCENT TECHNOLOGIES. In order to upgrade the processing capabilities of the AM 4, the AM 4 is typically replaced with an upgraded AM computer system, the LUCENT TECHNOLOGIES 3B21D computer system. As known to those skilled in the art, the 3B21D computer system comprises a high-speed, high-reliability, fault-tolerant, duplex computer that is bit-compatible with the 3B20D. Additional details regarding the hardware architecture of the AM 4 will be described in greater detail below with reference to FIG. 2.

The software architecture of the 5ESS is also modular. Functionality is split among different subsystems with clear interfaces between them. The main operating system used for call processing is the Operating System for Distributed Switching, while much of the OA&M work in the AM 4 runs under the UNIX Real-Time Reliable Operating System. Additional details regarding the architecture and operation of an electronic switching system 2, such as the 5ESS switch may be obtained from LUCENT TECHNOLOGIES.

Figure 2:
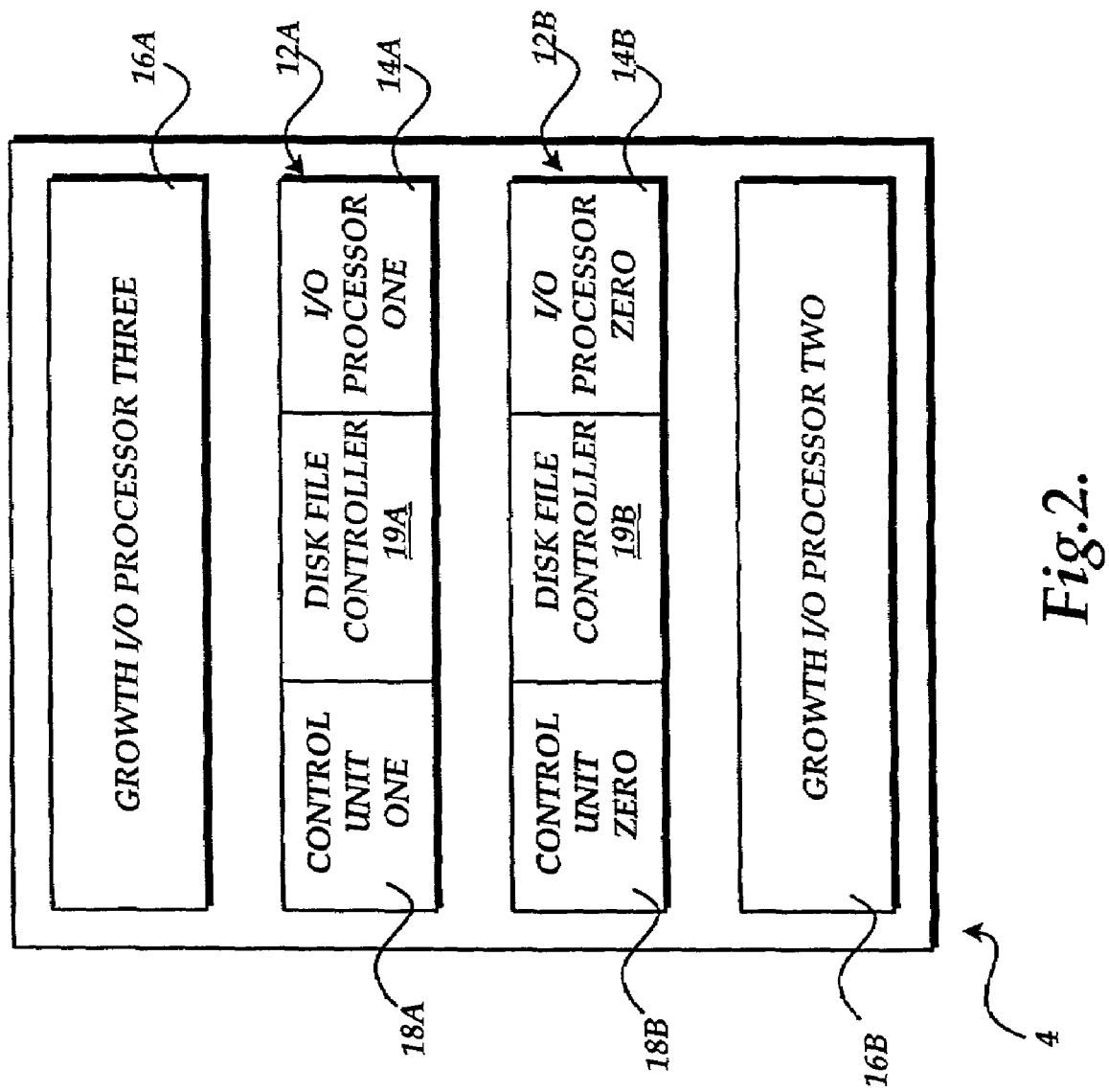
FIG. 2 is a block diagram showing an illustrative hardware architecture for an AM computer system utilized in various embodiments of the present invention.

Referring now to FIG. 2, an illustrative hardware architecture for an AM 4 utilized in one embodiment of the present invention will be described. As shown in FIG. 2, the AM 4 comprises two control units, control unit one 18A and control unit zero 18B. Each of the control units 18A–18B comprises a central processing unit having central control and main storage. Moreover, each of the control units 18A–18B are operated in a redundant and fail-safe manner wherein each of the control units 18A–18B is always comparing data. When one of the control units 18A–18B fails, the other control unit acts in its place.

The AM 4 also comprises two or more disk file controllers 19A–19B. The disk file controllers control the operation of any number of moving head disks, tape drives, or other external peripherals. The moving head disks may include storage capabilities for storing infrequently used programs and data, frequently used programs and data, and main storage regeneration. Additional details regarding the operation and configuration of the disk file controllers 19A–19B will be provided below with reference to FIG. 3.

The AM 4 also includes as a part of its standard configuration, two IOPs 14A–14B. The IOPs 14A–14B provide TTY and SDL interfaces to the control units 18A–18B, and connections to other external networks. In the embodiment of the invention described herein, control unit one 18A, disk file controller 19A, and IOP 14A are configured together as a processor unit 12A. Similarly, control unit zero 18B, disk file controller 19B, and IOP 14B are configured as a processor unit 12B. Additional details regarding the connection of external devices to the IOPs 14A–14B will be described below with reference to FIG. 3.

According to the embodiment of the present invention described herein, a standard configuration for the AM 4 only includes two IOPs 14A–14B. In order to provide additional input/output capabilities, a growth I/O processor two 16B and a growth I/O processor three 16A may be added to the configuration of the AM 4. The growth I/O processors 16A–16B provide additional connection capabilities for connecting TTY, SDL, and other types of external devices. Additional details regarding the connection of devices to the growth IOPs 16A–16B will be provided below with reference to FIG. 3.

Figure 3:
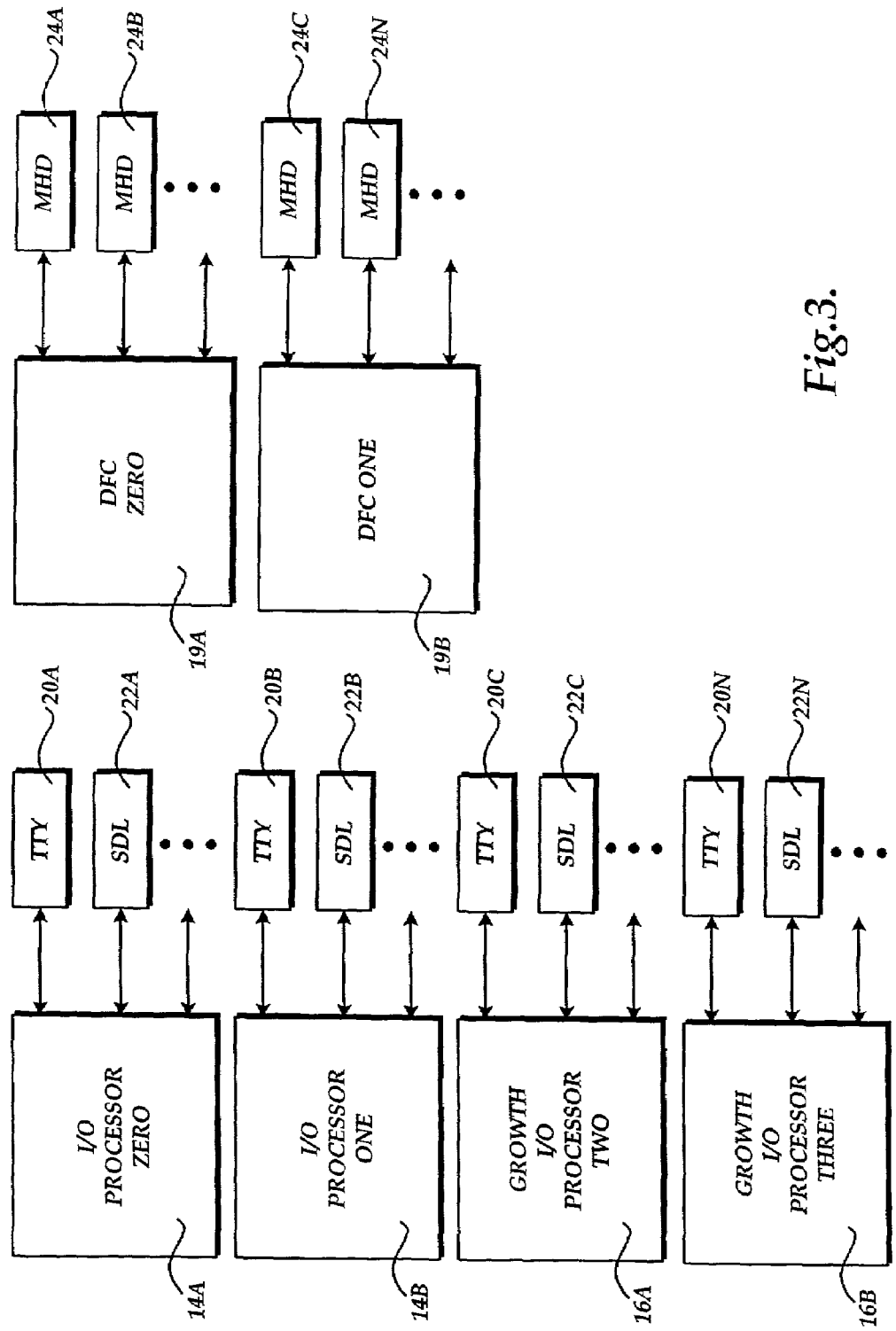
FIG. 3 is a block diagram showing an illustrative configuration of IOPs and control units utilized by an AM computer system in one embodiment of the present invention.

Turning now to FIG. 3, illustrative connections to the I/O processors 14A–14B, the growth I/O processors 16A–16B, and the disk file controllers 19A–19B will be described. As shown in FIG. 3, the IOPs 14A–14B and the growth IOP 16A–16B may be connected to a number of TTY devices 20A–20N or to a number of SDL devices 22A–22N. As known to those skilled in the art, the TTY devices 20A–20N and the SDL devices 22A–22N may comprise terminals, network connections, tape devices, and other types of devices. As shown in FIG. 3, the disk file controllers 19A–19B may be connected to any number of moving head disks 24A–24N. Additionally, the disk file controllers 19A–19B may be utilized to provide connect to other types of peripherals with the small computer systems interface ("SCSI"), including tape drives and other types of devices.

Figure 4:
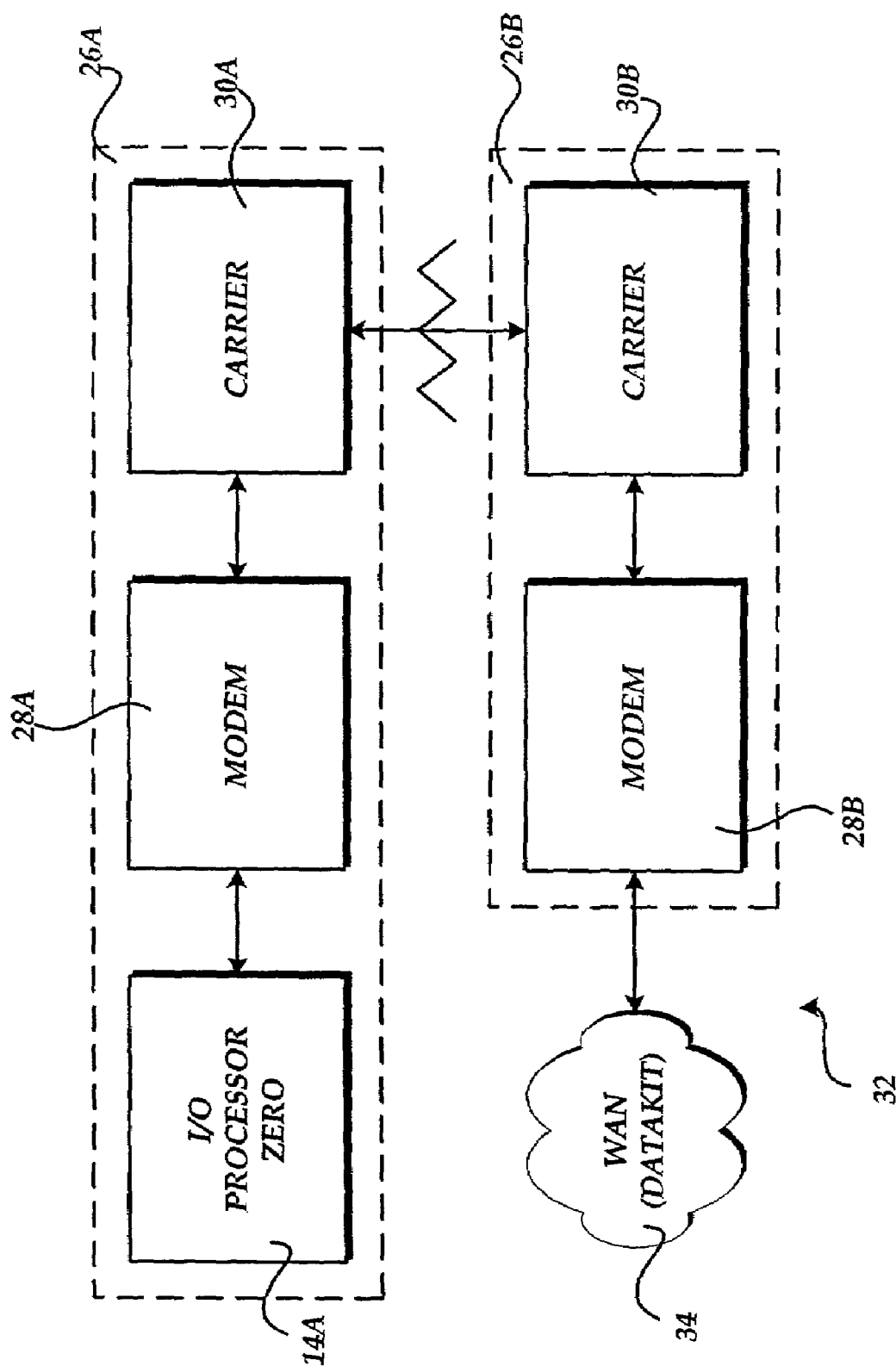
FIG. 4 is a network diagram illustrating a data communications circuit utilized by an AM computer system in one embodiment of the present invention.

Referring now to FIG. 4, a network diagram illustrating a data communications circuit 32 utilized by an AM 4 in one embodiment of the present invention will be described. In particular, FIG. 4 shows an interface to a wide area network ("WAN") 34 through the IOP 14A. As shown in FIG. 4, access to the WAN 34 is provided to an AM 4 located at a central office 26A through a second central office 26B.

In particular, the IOP 14A utilizes one of its TTY connections to connect to a modem 28A. In turn, the modem 28A is connected to a carrier 30A located in the central office 26A. The carrier 30A connects to a carrier 30B located in a secondary central office 26B. Carrier 30B is similarly connected to a modem 28B which completes the connection to the WAN 34. In the actual embodiment of the invention described herein, the WAN 34 comprises a DATAKIT network known to those skilled in the art. It should be appreciated that the AM 4 may be connected to other types of data communication circuits, networks, and devices through its TTY and SDL connections.

Referring now to FIG. 5, a data structure diagram will be described showing an illustrative standard hardware and software configuration 36. As will be described in greater detail below, the standard software and hardware configuration 36 comprises a standard configuration for IOPs, TTY devices, SDL devices, data communication circuits, moving head disks, and other peripherals utilized by the AM 4. The standard software and hardware configuration is created in such a manner that permits its use at AMs located at one or more electronic switching system sites.

As shown in FIG. 5, the standard software and hardware configuration 36 comprises a number of fields 46A–46N that describe the standard software and hardware configuration of an AM 4. In particular, fields 46A–46E describe the IOP, including the community, the physical slot, port, and identification of the hardware unit to which an external device has been attached. Fields 46F–46L describe the device connected to the hardware location identified by fields 46A–46E. In particular, fields 46F–46L describe, respectively, the controller name, card type, device type (i.e., TTY or SDL devices), TTY name, circuit, hardware location, and in-service or out-of-service state of the device. Moreover, fields 46M–46N provide a standard description of a data communication circuit.

Utilizing the fields 46A–46N, a standard configuration may be provided for TTY devices, SDL devices, data communication circuits, moving head disks, and other peripherals connected to the AM 4. In particular, a standard configuration for TTY devices 38 may be provided by utilizing fields 46A–46N to identify the connected TTY devices. A standard configuration for data communication circuits 40 may be similarly provided. Likewise, a standard configuration for SDL devices 42 may be also provided. A standard configuration for moving head disks 44 may also be created in a similar manner.

By utilizing a standard hardware and software configuration 36, the configuration of the AM 4 and its attached peripheral devices and communication circuits may be implemented over a number of electronic switching system sites. Additional details regarding the creation and use of the standard software and hardware configuration 36 will be provided below with reference to FIGS. 6–10.

Figure 6:
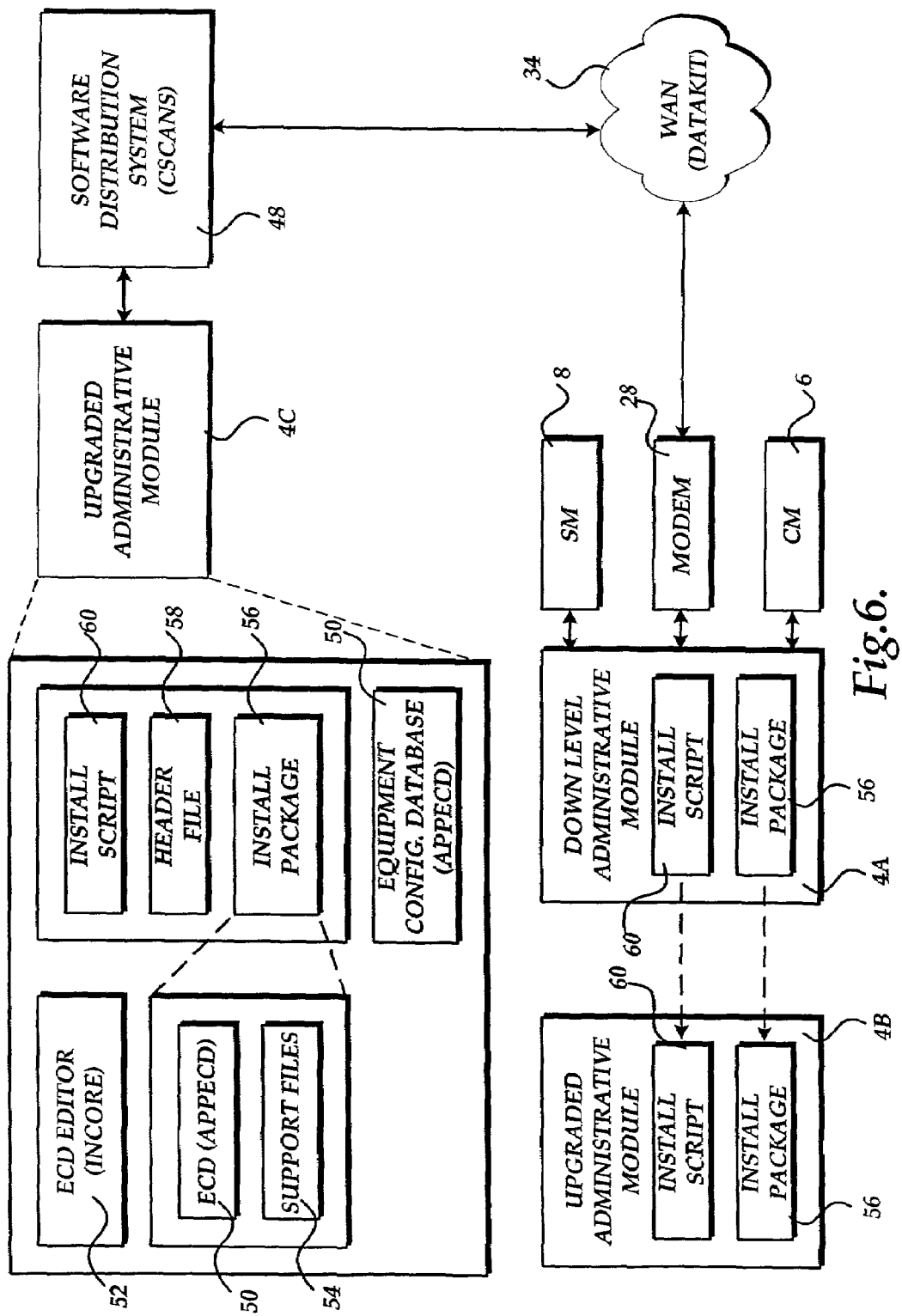
FIG. 6 is a network and software architecture diagram showing illustrative network connections between an upgraded AM computer system and a downlevel AM computer system utilized in embodiments of the present invention.

Referring now to FIG. 6, a network and software architecture diagram will be described showing illustrative network connections between an upgraded AM 4C and a downlevel AM 4A. As shown in FIG. 6, the downlevel AM 4A is located at an electronic switching system site and is to be replaced by the upgraded AM 4B. In the illustrative embodiment of the present invention described herein, the upgraded AM 4C is not located at the electronic switching system site comprising the downlevel AM 4A. As will be described in greater detail below, the upgraded AM 4C is utilized to create the standard software and hardware configuration 36 that is utilized to configure the upgraded AM 4B.

As discussed above, the upgraded AM 4C comprises a 3B21D computer system in the actual embodiment of the present invention described herein. The upgraded AM 4C comprises the computing components described above with respect to FIGS. 2 and 3. Moreover, the upgraded AM 4C includes a number of software components show in FIG. 6.

The software components utilized at the upgraded AM 4C include an equipment configuration database 50 that is utilized by the AM 4C to configure itself for operation with a particular set of connected devices. As known to those skilled in the art, an ECD editor 52 may be utilized to modify the equipment configuration database 50. Rather than modify the actual equipment configuration database 50 being utilized by the AM 4C, a copy is created of the equipment configuration database 50 that may be modified utilizing the ECD editor 52. In this manner, the ECD editor 52 may be utilized to modify the equipment configuration database 50 to reflect the standard software and hardware configuration 36 described above with respect to FIG. 5.

Once the equipment configuration database 50 has been modified to reflect the standard software and hardware configuration 36, the equipment configuration database 50 may be bundled with one or more support files 52 and compressed into an install package 56. According to the actual embodiment of the present invention described herein, the support files 54 comprise the VTOC2, ECD, DMERT, and APPDMERT files utilized by a 3B21D computer system. These files are well known to those skilled in the art.

An install script 60 may also be created at the upgraded AM 4C. As will be described in greater detail below, the install script 60 is executed on the upgraded AM 4B. The install script 60 decompresses the install package 56 and copies the equipment configuration database 50 and the support files 54 to their proper locations. A header file 58 may also be created that is utilized by a software distribution system 48 to route the install script 60 and the install package 56 to the downlevel AM 4A.

According to the actual embodiment of the present invention described herein, the software distribution system 48 routes the install script 60 and the install package 56 to the downlevel AM 4A through the WAN 34 and the modem 28. As mentioned briefly above, the downlevel AM 4A comprises a functioning administrative module computer located at a live electronic switching system site. Accordingly, the downlevel AM 4A is connected to the CM 6 and one or more switching modules 8. An upgraded AM 4B is also located at the electronic switching system 2 that will eventually replace the downlevel AM 4A. As will be described in greater detail below with respect to FIGS. 7–10, the data stored at the downlevel AM 4A is migrated to the upgraded AM 4B. Through this process, the install script 60 and the install package 56 are migrated to the upgraded AM 4B.

Once the install script 60 and install package 56 have been migrated to the upgraded AM 4B, the install script 60 may be executed to decompress the equipment configuration database 50 and the support files 54. The equipment configuration database 50 and support files 54 are then copied to their proper locations by the install script 60. Once these files are properly located, the upgraded AM 4B may be restarted using the equipment configuration database 50. In this manner, the upgraded AM 4B will be configured according to the standard software and hardware configuration 36. Additional details regarding the creation, distribution, and migration of the install script 60 and the install package 56 will be provided below with respect to FIGS. 7–10.

Figure 7:
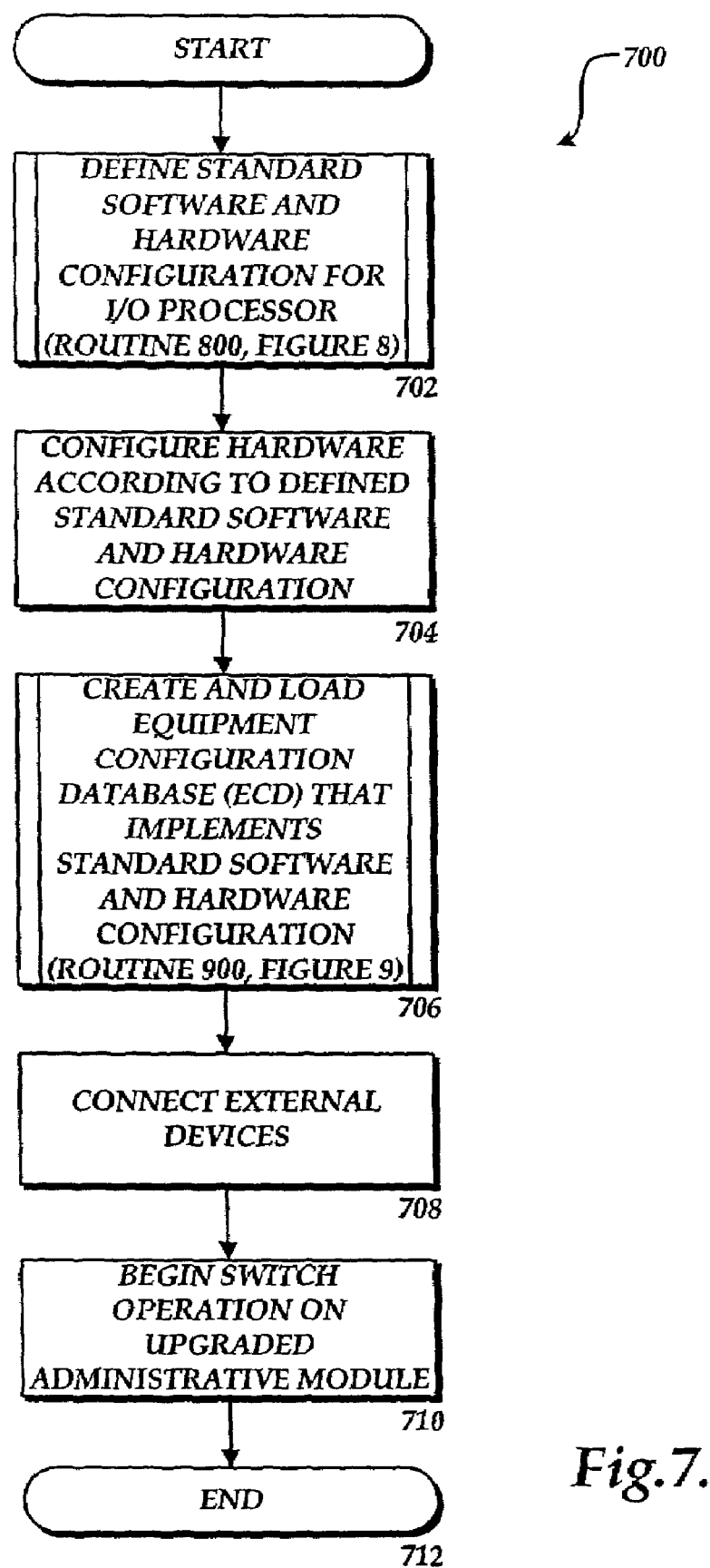
FIG. 7 is a flow diagram illustrating a method for configuring an upgraded AM computer system according to one embodiment of the present invention.

Referring now to FIG. 7, an illustrative routine 700 will be described for configuring and upgraded AM 4 according to one embodiment of the present invention. The routine 700 begins at block 702, where a standard software and hardware configuration is defined for the AM 4B. In particular, a standard hardware and software configuration may be defined for the IOPs, the connection of TTY and SDL devices, the configuration of data communication circuits, and the configuration of moving head disks. An illustrative routine 800 for defining the standard software and hardware configuration will be described below with reference to FIG. 8.

From block 702, the routine 700 continues to block 704, where the hardware devices located within the AM 4B are configured according to the defined standard software and hardware configuration. For instance, growth IOPs and moving head disks may be added to the physical configuration of the AM 4B. Other hardware referenced in the standard software and hardware configuration may also be added within the AM 4B.

From block 704, the routine 700 continues to block 706. At block 706, an equipment configuration database that implements the standard software and hardware configuration is created and loaded on the AM 4B. In particular, an ECD implementing the standard software and hardware configuration 36 is created utilizing a copy of an ECD on an upgraded AM 4C. The equipment configuration database is then distributed to the downlevel AM 4A. When the data located on the downlevel AM 4A is migrated to the upgraded AM 4B, the equipment configuration database implementing the standard software and hardware configuration is also transferred. Once the equipment configuration database has been migrated to the upgraded AM 4B, the equipment configuration database may be utilized to configure the upgraded AM 4B according to the standard software and hardware configuration. Additional details regarding the creation and loading of the equipment configuration database implementing the standard software and hardware configuration will be described below with reference to FIG. 9.

Once the equipment configuration database implementing the standard software and hardware configuration has been loaded onto the upgraded AM 4B, external devices located at the electronic switching site may be connected to the AM 4B. In particular, TTY, SDL, and other types of devices may be connected to the upgraded AM 4B. Additionally, the switching modules 8A–8N and the communications module 6 may be connected to the upgraded AM 4B.

From block 708, the routine 700 continues to block 710, where the upgraded AM 4B may be restarted and operation of the electronic switching site may be begun on the upgraded AM 4B. The downlevel AM 4A may then be removed from the electronic switching site. From block 710, the routine 700 continues to block 712, where it ends.

Figure 8:
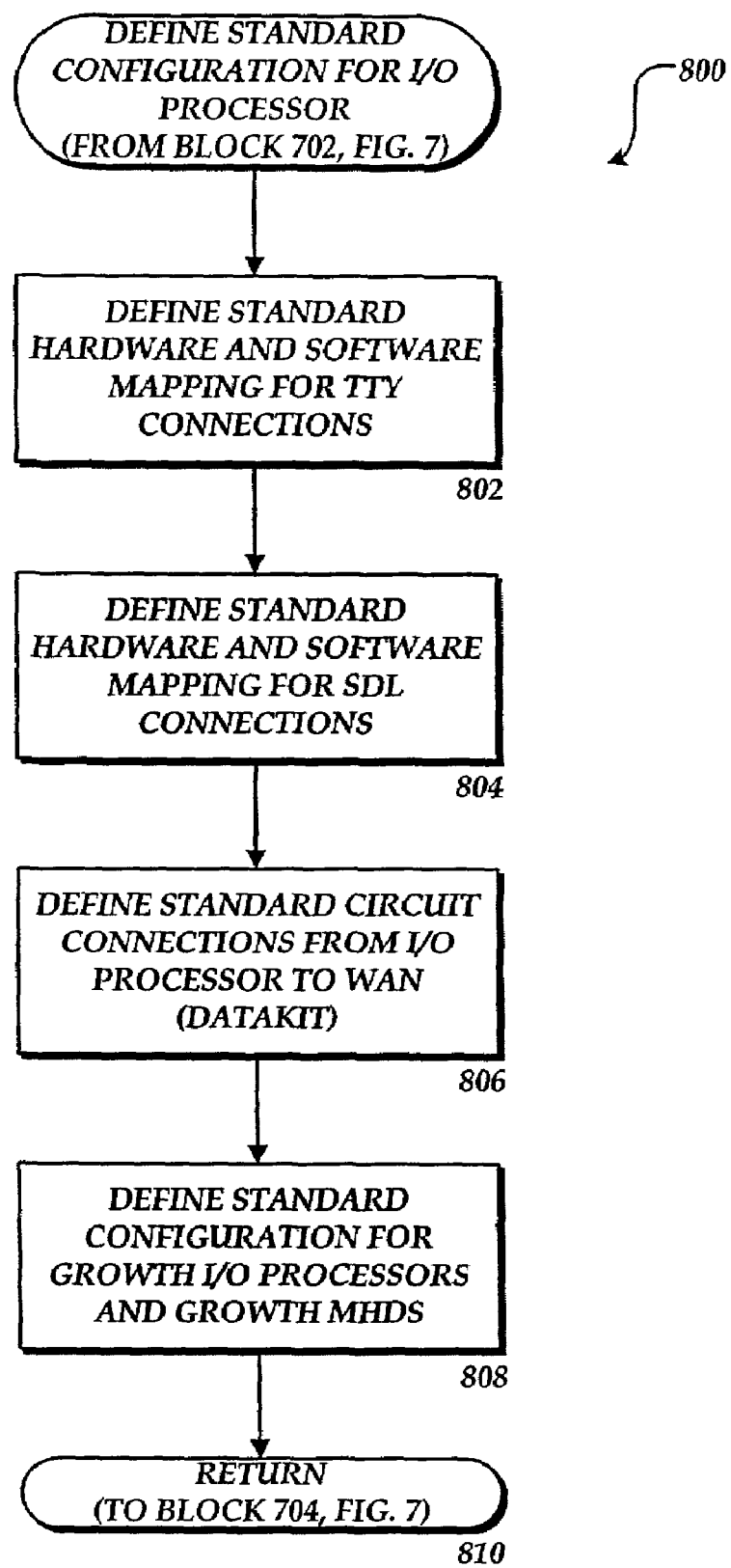
FIG. 8 is a flow diagram illustrating a method for defining a standard hardware and software configuration for an upgraded AM computer system in one embodiment of the present invention.

Referring now to FIG. 8, an illustrative routine 800 will be described for defining a standard hardware and software configuration for an upgraded AM 4B according to one embodiment of the present invention. The routine 800 begins at block 802, where a standard hardware and software mapping for TTY connections is defined. In particular, the TTY mapping may include a standard configuration of terminals and other types of TTY devices to be connected to the upgraded AM 4B.

From block 802, the routine 800 continues to block 804, where a standard hardware and software mapping is defined for SDL connections to the upgraded AM 4B. Similarly, at block 806, a standard mapping is created for circuit connections from the I/O processor of the upgraded AM 4B to the one or more data communication circuits. For instance, a standard circuit connection may be defined from the upgraded AM 4B to the WAN 34.

From block 806, the routine 800 continues to block 808, where a standard configuration is created for growth IOPs contained within the upgraded AM 4B. Additionally, a standard configuration may also be created for growth moving head disks not included as a part of the standard configuration of the upgraded AM 4B. From block 808, the routine 800 continues to block 810, where it returns to block 704 described above with respect to FIG. 7.

Figure 9A:
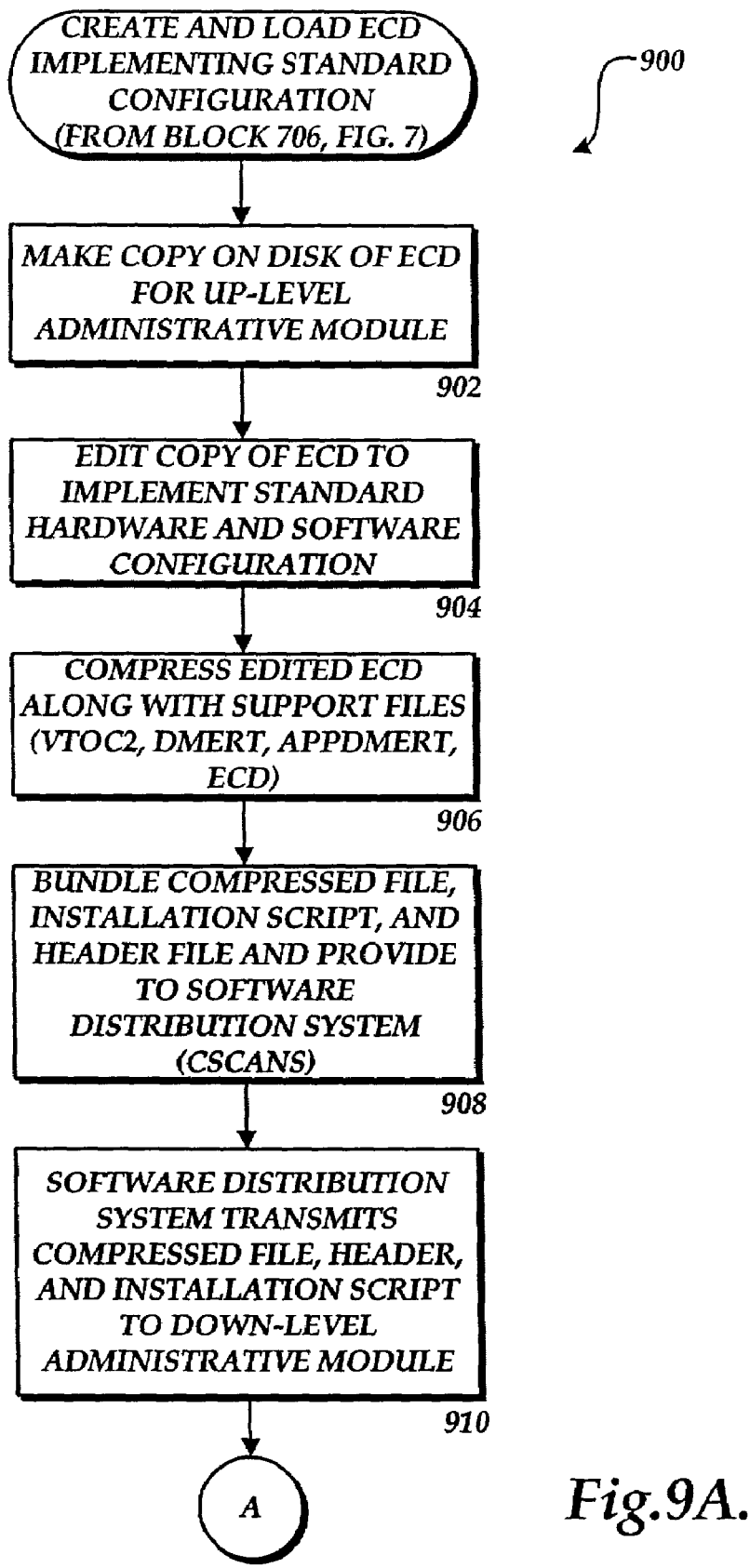
FIGS. 9A and 9B are flow diagrams showing an illustrative method for creating and loading an equipment configuration database implementing a standard configuration in one embodiment of the present invention.
Figure 9B:
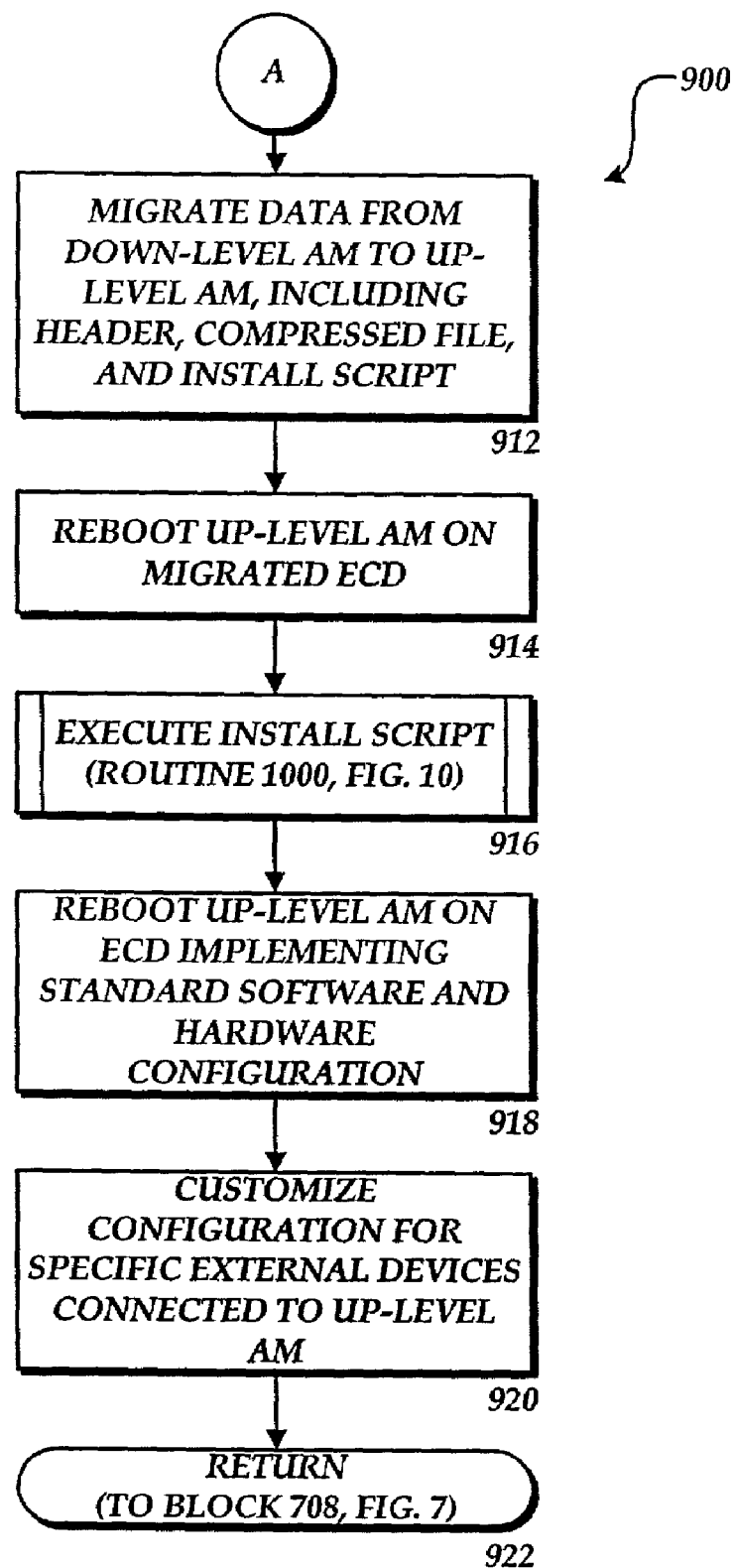

Referring now to FIGS. 9A–9B, an illustrative routine 900 will be described for creating and loading an equipment configuration database that implements the standard software and hardware configuration. The routine 900 begins at block 902, where a disk copy is made of the equipment configuration database for the up-level AM 4C. A copy is made on disk of the equipment configuration database so that the copy can be edited without disrupting the operation of the AM 4C.

From block 902, the routine 900 continues to block 904, where the copy of the equipment configuration database on disk is edited in a manner to implement the standard hardware and software configuration. As discussed briefly above with reference to FIG. 6, an ECD editor, such as the INCORE Editor from LUCENT TECHNOLOGIES, is utilized to edit the equipment configuration database. Once the equipment configuration database 50 has been edited to implement the standard software and hardware configuration, the edited equipment configuration database is compressed along with a number of support files to create an install package 56. As discussed above with reference to FIG. 6, the support files comprise the VTOC2, DMERT, APPDMERT, and ECD utilized by the 3B21D computer system and known to those skilled in the art.

From block 906, the routine 900 continues to block 908, where the compressed install package 56, a header file 58, and an install script 60 are bundled and provided to a software distribution system 48. As described briefly above, the install script 60 comprises a standard shell script for uncompressing the install package 56 and copying the equipment configuration database and the support files to their appropriate locations. The operation of an illustrative install script will be described below with reference to FIG. 10.

The header file 58 comprises instructions to the software distribution system 46 as to the destination of the install package 56 and the install script 60. In this manner, the software distribution system 48 is instructed to transmit these files to the downlevel AM 4A at block 910. In the illustrative embodiment of the invention described herein, the software distribution system comprises the CSCANS distribution system known to those skilled in the art. From block 910, the routine 900 continues to block 912.

At block 912, data stored at the downlevel AM 4A is migrated to the upgraded AM 4B. The migrated data includes the install script 60 and the install package 56 transmitted to the downlevel AM 4A by the software distribution system 48. According to one embodiment of the present invention, the data stored on the downlevel AM 4A is migrated to the upgraded AM 4B by physically removing one or more of the moving head disks from the downlevel AM 4A and installing the disks in the upgraded AM 4B. Alternative methods for migrating the data stored on the downlevel AM 4A to the upgraded AM 4B may also be utilized.

From block 912, the routine 900 continues to block 914, where the upgraded AM 4B is restarted on the equipment configuration database migrated from the downlevel AM 4A. The routine 900 then continues from block 914 to block 916, where the install script 60 is executed. As discussed above, the install script 60 decompresses the install package 56 and copies the equipment configuration database 50 in the support files 54 to their appropriate locations on the upgraded AM 4B. An illustrative routine 1000 will be described below for executing the install script 60.

From block 916, the routine 900 continues to block 918, where the upgraded AM 4B is restarted utilizing the equipment configuration database implementing the standard software and hardware configuration. The routine 900 then continues to block 920, where the equipment configuration database may be configured for specific external devices connected to the upgraded AM 4B. In this manner, the configuration of the upgraded AM 4B may be customized for devices and network connections unique to the specific electronic switching system site at which the AM 4B is located. The routine 900 then continues from block 920 to block 922, where it returns to block 708 shown above in FIG. 7.

Figure 10:
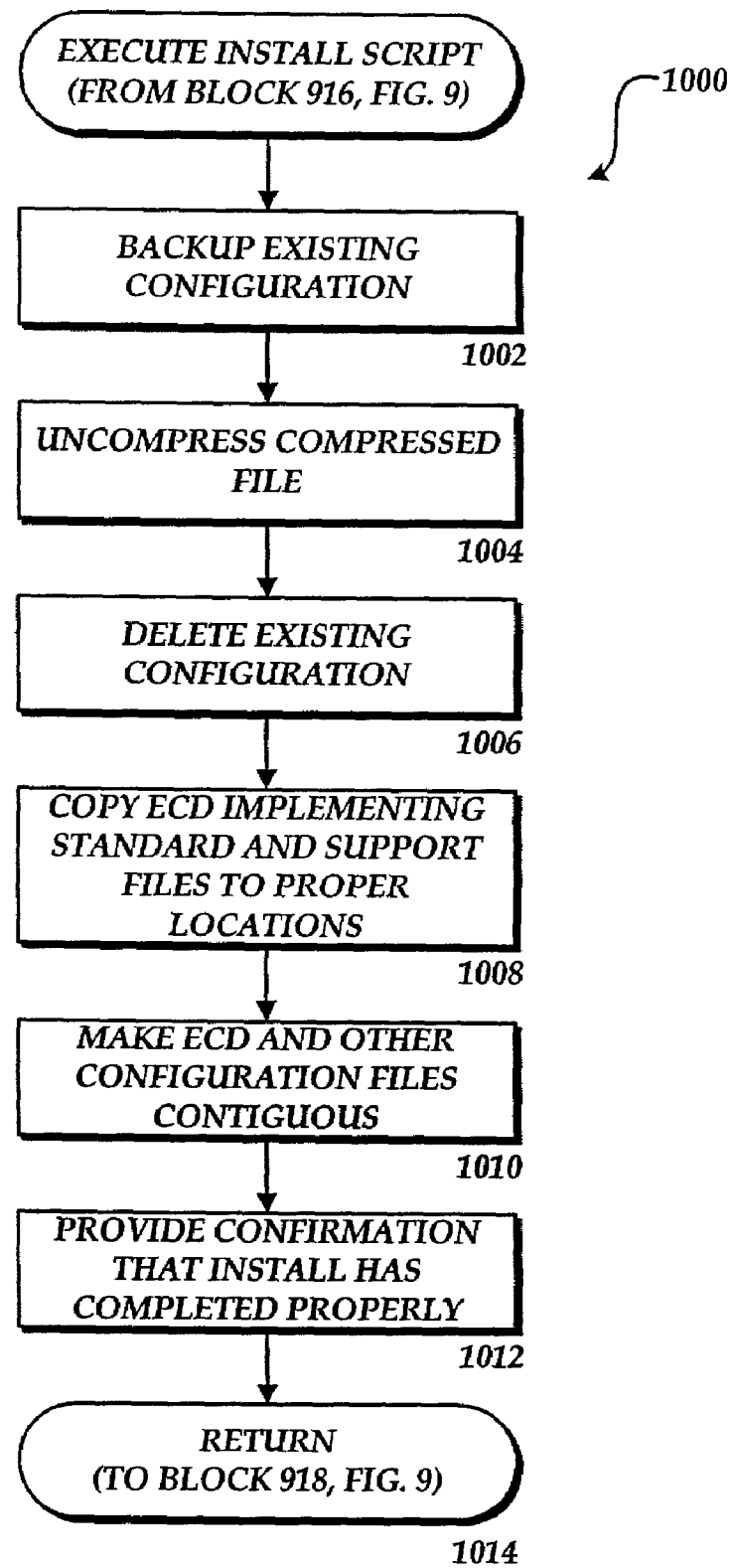
FIG. 10 is a flow diagram showing a method for executing an install script according to one actual embodiment of the present invention.

Referring now to FIG. 10, an illustrative routine 1000 will be described for executing the install script 60. As mentioned above, the install script 60 comprises a standard Unix shell script for uncompressing the install package 56, and copying the equipment configuration database 50 and the support files 54 to their proper locations. The routine 1000 begins at block 1002, where the existing equipment configuration database located on the upgraded AM 4B is stored in a backup location. The routine 1000 then continues to block 1004, where the compressed install package 56 is uncompressed.

From block 1004, the routine 1000 continues to block 1006, where the existing configuration of the upgraded AM 4B is deleted. The routine 1000 then continues to block 1008, where the equipment configuration database 50 implementing the standard software and hardware configuration and the support files are copied to their proper locations on the upgraded AM 4B. The equipment configuration database 50 and other configuration files located at the upgraded AM 4B are then joined so that they are readable in a contiguous manner as required by the 3B21D. Once this has been accomplished, the routine 1000 continues to block 1012, where a confirmation is provided to the user that the install script has completed properly. The routine 1000 then continues to block 1014, where it returns to block 918, described above with respect to FIG. 9.

In light of the above, it should be appreciated that embodiments of the invention provide a method, system, apparatus, and computer-readable medium for configuring an upgraded AM computer system. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for configuring an upgraded administrative module computer in an electronic switching system, comprising:

defining a standard hardware and software configuration for the administrative module computer;

creating an equipment configuration database utilized to configure the operation of the upgraded administrative module computer in accordance with the standard hardware and software configuration;

compressing the equipment configuration database to create a configuration install package;

transmitting the configuration install package and an install script to a downlevel administrative module computer utilized in the electronic switching system;

migrating data stored on the downlevel administrative module computer to the upgraded administrative module computer, the data including the equipment configuration database, wherein migrating data comprises copying data files stored on the down level administrative module computer, including the configuration install package, to the upgraded administrative module computer;

configuring the upgraded administrative module computer with the equipment configuration database, wherein configuring the upgrade administrative module computer comprises:

executing the install script to uncompress the configuration install package on the upgraded administrative module computer, configuring the upgraded administrative module computer with the equipment configuration database, customizing the equipment configuration database for non-standard external devices connected to the upgraded administrative module computer; and modifying an editable copy of the equipment configuration database to reflect the standard hardware and software configuration.

2. A method for configuring an upgraded administrative module computer in an electronic switching system, comprising:

defining a standard hardware and software configuration for the administrative module computer;

creating an equipment configuration database utilized to configure the operation of the upgraded administrative module computer in accordance with the standard hardware and software configuration;

compressing the equipment configuration database and support files to create a configuration install package;

transmitting the configuration install package to a downlevel administrative module computer utilized in the electronic switching system;

migrating data stored on the downlevel administrative module computer to the upgraded administrative module computer, the data including the equipment configuration database;

configuring the upgraded administrative module computer with the equipment configuration database, wherein the standard hardware and software configuration comprises a standard configuration for teletype devices connected to the upgraded administrative module computer, wherein configuring the upgraded administrative module computer comprises:

executing an install script to uncompress the configuration install package on the upgraded administrative module computer, and customizing the equipment configuration database for non-standard external devices connected to the upgraded administrative module computer.

3. The method of claim 2, wherein the standard hardware and software configuration comprises a standard configuration for synchronous data link devices connected to the upgraded administrative module computer.

4. The method of claim 3, wherein the standard hardware and software configuration comprises a standard configuration for data communication circuits connecting the upgraded administrative module computer to an external network.

5. The method of claim 4, wherein the standard hardware and software configuration comprises a standard configuration for input/output processors utilized by the upgraded administrative module computer.

6. The method of claim 5, wherein the standard hardware and software configuration comprises a standard configuration for mass storage devices connected to the upgraded administrative module computer.

7. The method of claim 6, wherein creating an equipment configuration database comprises:

making an editable copy of an equipment configuration database for the upgraded administrative module computer; and modifying the editable copy of the equipment configuration database to reflect the standard hardware and software configuration.

8. The method of claim 7, wherein executing the install script comprises:

creating a backup of an existing equipment configuration database stored on the upgraded administrative module computer;

decompressing the equipment configuration database and support files from the configuration install package;

deleting the existing equipment configuration database from the upgraded administrative module computer;

copying the equipment configuration and support files to a proper location on the upgraded administrative module computer; and creating a contiguous equipment configuration database from the equipment configuration file and a supplemental configuration equipment configuration database.

9. A method for configuring an upgraded administrative module computer in an electronic switching system, comprising:

creating an equipment configuration database for configuring the operation of the upgraded administrative module computer in accordance with a standard hardware and software configuration;

compressing the equipment configuration database and support files to create a configuration install package;

transmitting the configuration install package to a downlevel administrative module computer utilized in the electronic switching system through a networked software distribution system;

copying data files stored on the downlevel administrative module computer, including the equipment configuration database, to the upgraded administrative module computer;

executing an install script to uncompress the configuration install package on the upgraded administrative module computer;

configuring the upgraded administrative module computer with the equipment configuration database;

customizing the equipment configuration database for non-standard external devices connected to the upgraded administrative module computer; and configuring the upgraded administrative module computer with the customized equipment configuration database.

10. The method of claim 9, wherein the standard hardware and software configuration comprises a standard configuration for teletype devices connected to the upgraded administrative module computer and for synchronous data link devices connected to the upgraded administrative module computer.

11. The method of claim 10, wherein the standard hardware and software configuration comprises a standard configuration for data communication circuits connecting the upgraded administrative module computer to an external network and for input/output processors utilized by the upgraded administrative module computer.

12. The method of claim 11, wherein the standard hardware and software configuration comprises a standard configuration for mass storage devices connected to the upgraded administrative module computer.

13. The method of claim 12, wherein the downlevel administrative module computer comprises a LUCENT TECHNOLOGIES 3B20D computer and wherein the upgraded administrative module computer comprises a LUCENT TECHNOLOGIES 3B21 D computer.

14. The method of claim 13, wherein the electronic switching system comprises a LUCENT TECHNOLOGIES 5ESS switch.

15. A method for configuring an upgraded administrative module computer in an electronic switching system, comprising:

defining a standard hardware and software configuration for the administrative module computer, the standard hardware and software configuration comprising a standard configuration for teletype devices, synchronous data link devices, data communication circuits, input/output processors, and mass storage devices;

creating an equipment configuration database utilized to configure the operation of the upgraded administrative module computer in accordance with the standard hardware and software configuration;

transmitting a compressed configuration install package and an install script to the downlevel administrative module computer through a networked software distribution system, the compressed configuration install package comprising the equipment configuration database and support files;

copying data files stored on the downlevel administrative module computer, including the install package, to the upgraded administrative module computer; and executing the install script to uncompress the configuration install package on the upgraded administrative module computer;

configuring the upgraded administrative module computer with the equipment configuration database; and customizing the equipment configuration database for non-standard external devices connected to the upgraded administrative module computer.

16. The method of claim 15, wherein executing the install script comprises:

creating a backup of an existing equipment configuration database stored on the upgraded administrative module computer;

decompressing the equipment configuration database and support files from the configuration install package;

deleting the existing equipment configuration database from the upgraded administrative module computer;

copying the equipment configuration and support files to a proper location on the upgraded administrative module computer; and creating a contiguous equipment configuration database from the equipment configuration file and a supplemental configuration equipment configuration database.

* * * * *